United States Patent [19]

Furuta et al.

[11] 4,331,308

[45] May 25, 1982

[54] BACK SPACING APPARATUS FOR A TRANSCRIBING MACHINE

[75] Inventors: Kenzi Furuta, Hachioji; Makoto Kondo, Fuchu, both of Japan

[73] Assignee: Olympus Optical Co., Ltd., Tokyo, Japan

[21] Appl. No.: 148,500

[22] Filed: May 9, 1980

[30] Foreign Application Priority Data

May 15, 1979 [JP] Japan ................................ 54-59487

[51] Int. Cl.³ ...................... G11B 15/13; B65H 59/38; G03B 1/02
[52] U.S. Cl. ......................................... 242/191; 318/6
[58] Field of Search .................. 242/186–188, 242/191, 182; 360/71–74; 318/6, 7; 274/1

[56] References Cited

U.S. PATENT DOCUMENTS

| | | | |
|---|---|---|---|
| 3,758,726 | 9/1973 | Bolick, Jr. et al. ................. | 274/1 X |
| 3,761,035 | 9/1973 | Wang .................... | 242/182 |
| 4,172,231 | 10/1979 | d'Alayer de Costemore d'Arc et al. ............................. | 318/7 |

FOREIGN PATENT DOCUMENTS 2707381 2/1977 Fed. Rep. of Germany .
2730134 2/1978 Fed. Rep. of Germany .

*Primary Examiner*—Leonard D. Christian
*Attorney, Agent, or Firm*—Frishauf, Holtz, Goodman & Woodward

[57] ABSTRACT

A back spacing apparatus for a transcribing machine comprises a first means for providing a first signal (a) corresponding to the period of rotation of a supply reel or a take-up reel, a drive source for rewinding a tape toward the supply reel and a second means for providing electric energy (Tm×V) corresponding to the period (Tm) of the first signal (a) to the drive source for rewinding to vary the r.p.m. of the supply reel at the time of rewinding the tape toward the supply reel or the period of the rewinding operation according to the first signal (a). The magnitude (Tm×V) of the electric energy is varied in accordance with the period (Tm) of the first signal (a) for making the length of the tape rewound toward the supply reel substantially constant irrespective of the diameter of the tape rolled on the supply reel.

11 Claims, 21 Drawing Figures

F I G. 1
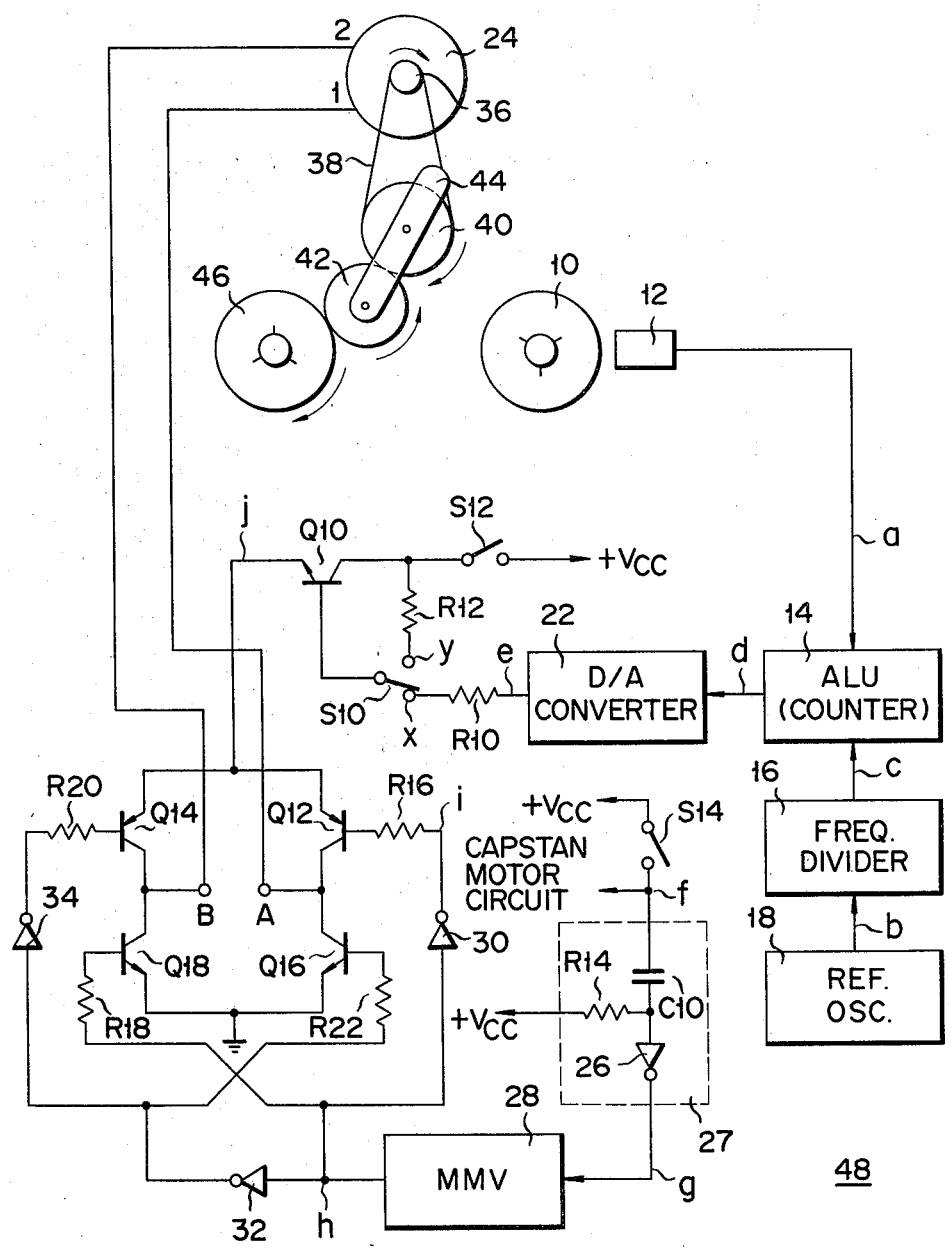

BACK SPACING APPARATUS FOR A TRANSCRIBING MACHINE

BACKGROUND OF THE INVENTION

This invention relates to tape players used with dictating transcriber machines and, more particularly, to a back spacing apparatus for automatically rewinding a predetermined length of the tape when the tape player is switched from a playback mode over to a stop mode.

When typing speech information which has been recorded on a tape, it sometimes happens that some part of the reproduced speech is indistinct or cannot be caught. In such a case, it is necessary to hear again the indistinct part of the speech by stopping the tape, slightly rewinding it and then playing it back again. This means that the typist has to switch the tape deck to a rewind mode and then back to the playback mode again every time a word or phrase that cannot be clearly heard. This cumbersome operation is also necessary in such a case as when interrupting the typing due to an urgent task and subsequently resuming it.

In order to overcome the above inconvenience, back spacing apparatuses for automatically rewinding the tape are presently in use. Examples of such back spacing apparatus are disclosed in Japanese Patent Publication No. 11211/77 and Japanese Patent Disclosure No. 71304/75. However, although it is desirable that the tape is rewind for back spacing by a constant length, for instance a length corresponding to a couple of daily conversation words (i.e., 1 to 3 seconds), the prior-art back spacing apparatuses give no particular consideration to on the constant length automatic rewinding. More particularly, with the prior-art apparatus the rewinding operation is effected for a constant period of time, so that the rewound tape length varies with the diameter of the tape rolled on the supply reel side; it is large when the supply reel side tape roll diameter is large and is small when the diameter is small. This means that in case the rewound tape length is adjusted such that it is optimum when the supply reel side tape roll diameter is minimum, an unnecessarily large length of the tape is rewound when the tape roll diameter is maximum. Conversely, where adjustment is made such that the tape is rewound by an optimum length when the tape roll diameter is maximum, at the time when the tape roll diameter is small the rewound tape length is insufficient so that it is likely that a part of the repeated word or phrase cannot be heard.

In order to overcome this drawback, there have been proposed apparatuses with which the back spacing period, i.e., the rewound tape length, is manually variable, as disclosed in the afore-mentioned Japanese patent Publication No. 11211/77 and U.S. Pat. No. 3,758,726. However, the operation of manually changing the rewound tape length reduces the efficiency of the typist's work.

SUMMARY OF THE INVENTION

The object of the invention is to provide a back spacing apparatus which effects the rewinding always by a constant tape length irrespective of the supply reel side tape roll diameter.

In order to achieve this object, the back spacing apparatus according to the invention has a means for varying the rewound tape driving energy in accordance with the supply reel side tape roll diameter. Thus, a constant length of the tape can always be automatically rewound even though the supply reel side tape roll diameter changes with the driving of the tape.

BRIEF DESCRIPTION OF THE DRAWINGS

FIG. 1 is a schematic repesentation of an embodiment of the back spacing apparatus according to the invention;

DETAILED DESCRIPTION OF THE PREFERRED EMBODIMENTS

Figure 2:
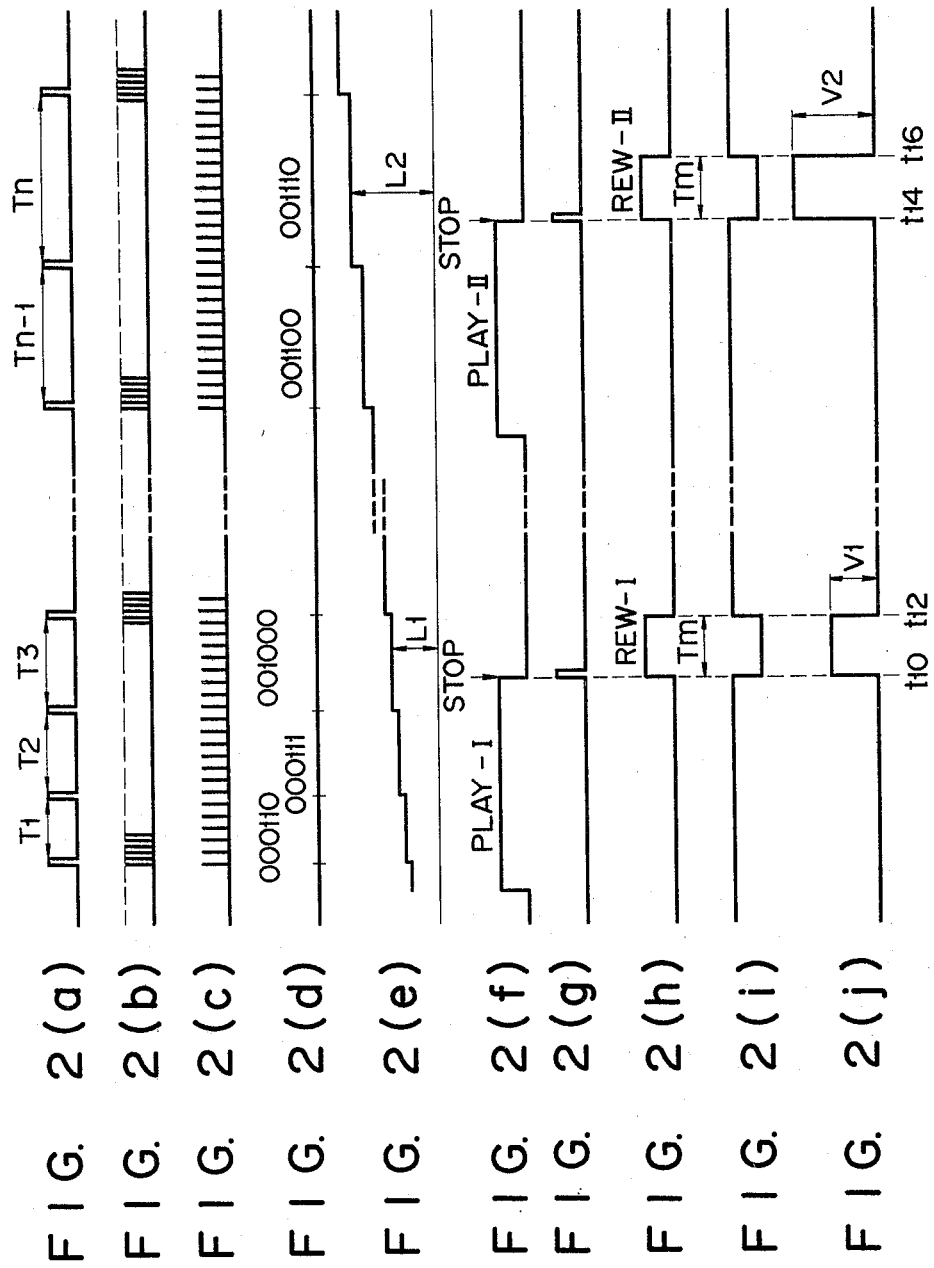
FIGS. 2(a)–2(j) are diagrams of signals illustrating the operation of the apparatus shown in FIG. 1.

For the sake of the brevity of description, in the drawings common or like parts are designated by common or like reference symbols, and repeated descriptions are avoided.

FIG. 1 shows a back spacing apparatus according to the invention. A take-up reel base 10 is provided with a magnetic ring (not shown) which is rotated in an interlocked relation to the reel base. A change of the magnetic field that is produced with the rotation of the magnetic ring is detected by, for instance, a semiconductor Hall element 12. The Hall element 12 constitutes a first means for producing a first signal a, the period $T_n$ ($n=1, 2, 3, \ldots$) of which corresponds to the period of rotation of the reel base 10 as shown in FIG. 2a. The period $T_n$ is the longer the greater the diameter of the tape rolled on the take-up reel or the smaller the diameter of the tape rolled on the supply reel. The Hall element 12 may be a magnetically on-off operated lead switch. Alternatively, it may be replaced with a photo-interrupter which intermittently interrupts a light path with the rotation of the reel base 10. The first signal a is coupled to an arithmetic logic unit (ALU) or counter circuit 14. A second signal c as shown in FIG. 2c is also coupled from a frequency divider 16 to the ALU circuit 14. This second signal c is produced through frequency division of a reference signal b (as shown in FIG. 2b) produced from a reference oscillator 18.

The ALU circuit 14 counts the number of pulses of the second signal c appearing during each period $T_n$ of the first signal a and produces a third signal d which has digital information as shown in FIG. 2d. The ALU circuit 14 may be a counter which counts the number of pulses of the second signal c with the period of the first signal a as the gating period. For example, it may be a 6-bit binary counter producing, when 6 pulses of the second signal c are given to it during a first period T1 of the first signal a, a binary code "000110" as the third signal.

The third signal d is coupled to a digital-to-analog (D/A) converter 22. The D/A converter 22 produces a fourth signal e, the DC level of which corresponds to the information of the third signal d as shown in FIG. 2e. For example, when 8 pulses are provided as the second signal c at the time when the period of the first signal a is T3, a code "001000" is supplied as the third signal d to the D/A converter 22, which then produces as the fourth signal e an output having a level L1 proportional to the value represented by the input code. The fourth signal e is coupled through a resistor R10 to a first contact x of a switch S10, which has its contactor connected to the base of an NPN transistor Q10. The collector of the transistor Q10 is connected through a switch S12 to a power supply +Vcc, and it is also connected through a resistor R12 to a second contact y of the switch S10. When the tape deck is in a fast forward (FF) mode or in a rewind (REW) mode, the switch S10 is set on the side of the second contact y. When the tape deck operation is switched over to the playback (PLAY) mode or stop (STOP) mode, the switch S10 is switched to the side of the first contact x.

The emitter of the transistor Q10 is connected to the emitters of NPN transistors Q12 and Q14, which have their collectors connected to the respective collectors of NPN transistors Q16 and Q18 which have their emitters grounded. The collectors of the transistors Q12 and Q16 are connected through a terminal A to a first terminal of a reel motor 24. The motor 24 is used as a drive source for the rewinding. A second terminal of the motor 24 is connected through a terminal B to the collectors of the transistors Q14 and Q18.

Now, a case when the tape deck operation mode is switched from the playback mode over to the stop mode at an instant t10 as shown in FIGS. 2f to 2j will be considered. When the playback mode PLAY-1 is switched over to the stop mode, a switch S14 shown in FIG. 1 is turned off. As a result, a capstan motor circuit (as shown in FIG. 3) is disconnected from the power supply +Vcc whereupon a fifth signal f appearing at a terminal of the switch S14 of the side thereof connected to the capstan motor circuit is inverted to a low level as shown in FIG. 2f. The fifth signal f is coupled through a capacitor C10 to an inverter 26, which has its input terminal coupled through a resistor R14 to the power supply +Vcc. The capacitor C10 and resistor R14 constitute a differentiating circuit. Thus, at the instant t10 a negative pulse of the fifth signal f appears at the input terminal of the inverter 26. This negative pulse is inverted through the inverter 26 so that it is coupled as a positive trigger pulse g as shown in FIG. 2g to a monostable multivibrator (MMV) 28. The capacitor C10, resistor R14 and inverter 26 constitute a trigger pulse generator 27.

When it is triggered by the trigger pulse g, the multivibrator 28 produces a sixth signal h having a predetermined pulse width Tm as shown in FIG. 2h. The pulse width Tm can be freely set by appropriately adjusting the time constant of the MMV circuit 28. The sixth signal h is coupled through an inverter 30 and a resistor R16 to the base of the transistor Q12, and it is also coupled through a resistor R18 to the base of the transistor Q18. It is further coupled to an inverter 32. The output of the inverter 32 is coupled through an inverter 34 and a resistor R20 to the base of the transistor Q14. It is also coupled through a resistor R22 to the base of the transistor Q16.

When the sixth signal h is inverted to a high level with the triggering of the MMV circuit 28, the transistor Q18 is turned "on". At the same time, the output signal i of the inverter 30 is inverted to a low level as shown in FIG. 2i, and thus the transistor Q12 is also turned "on". Meanwhile, while the sixth signal h is at the high level, the transistors Q14 and Q16 are "off" since the signal is inverted through the inverter 32. Thus, during a period Tm from the instant t10 to an instant t12 the transistors Q12 and Q18 are "on" while the transistors Q14 and Q16 are "off". This means that during this period the terminal B is grounded, while the terminal A is connected to the emitter of the transistor Q10.

When the tape deck is stopped at the instant t10, the fourth signal e is coupled as a signal of the high level L1 through the resistor R10 and the first contact x of the switch S10 to the base of the transistor Q10. As a result, a seventh signal j, having a voltage V1, which corresponds to the level L1 of the fourth signal e as shown in FIG. 2j, is produced from the emitter of the transistor Q10, and it is coupled through the transistor Q12 and terminal A to the first terminal of the motor 24. The second terminal of the motor 24 is grounded through the terminal B and transistor Q18. When the seventh signal j is coupled to the first terminal of the motor 24, a pulley 36 mounted on a shaft of the motor 24 is rotated in the clockwise direction. The rotation of the motor 24 is transmitted through a belt 38 to an idler 40. The rotation of the idler 40, which is the clockwise rotation, is transmitted as rotation in the opposite direction to the idler 42. The idler 42 is mounted on a movable lever 44, and with the clockwise rotation of the idler 40 the lever 44 receives a force tending to cause rotation thereof in the clockwise direction. With this force, the idler 42 is brought into contact with and urged against the supply reel base 46. Thus, with the counterclockwise rotation of the idler 42 the reel base 46 is rotated in the clockwise direction, whereby the tape (not shown) is rewound.

When the sixth signal h is inverted at the instant t12, the direction of the current supplied to the motor 24 is inverted, thus causing inversion of the rotation of the idler 40 to the counterclockwise direction. At this time, the idler 42 is separated from the reel base 46 by the rotational force given by the idler 40. Thus, after the instant t12 the reel base 46 is not rotated in the counterclockwise direction. If it is desired to stop the motor 24 at the instant t12, an analog gate circuit in which the fourth signal e passes only when the sixth signal h is at the high level may, for example, be provided within the D/A converter 22. Alternatively, a plunger mechanism which turns off the switch S12 at the instant of the falling of the sixth signal h, during a time that the tape deck is in the stop mode, may be provided.

The extent of the rotation of the reel base 46 caused with the rotation of the motor 24 is substantially proportional to the electric energy supplied to the motor 24. This electric energy is proportional to the product of the pulse width Tm of the sixth signal h and the voltage V1 of the seventh signal j. As has been mentioned earlier, the voltage V1 of the seventh signal j corresponds to the level L1 of the fourth signal e, and the level L1 of the fourth signal e corresponds to the code "001000" of the third signal d. Consequently, the electric energy given to the motor 24 for rewinding the tape to the supply reel side corresponds to the period Tn of the first signal a.

This will be made more clear by taking a case when the quantity of tape up on the take-up reel is increased. When switching from playback mode PLAY-II over to stop mode takes place at an instant t14 in FIG. 2, the MMV circuit 28 is triggered by the trigger pulse g. As a result, the sixth signal h having the pulse width Tm is produced from the MMV circuit 28, so that the transistors Q12 and Q18 are held "on" during a period from instant t14 to instant t16. It is assumed that, for instance, 14 pulses are produced as the second signal c during the period Tn of the first signal a from the instant t14. In this case, a binary code "001110" is produced as the third signal d from the ALU circuit 14, and the D/A converter 22 produces the fourth signal e as an output having a level L2 which is proportional to the binary code. At this time, as the seventh signal j a voltage V2 corresponding to the level L2 is produced from the emitter of the transistor Q10. It is to be understood that with increase of the period of the first signal a (e.g. from T3 to Tn) the voltage of the seventh signal j is increased (e.g. from V1 to V2). In other words, the electric energy given to the motor 24 for rewinding the tape is substantially proportional to the period Tn of the first signal a. In the embodiment of FIG. 1, the variation of the electric energy according to the length of the period Tn is achieved through variation of the voltage of the seventh signal j; with this variation of the voltage the r.p.m. (rotational speed) of the supply reel 46 at the time of the rewind mode is varied.

The components 14 to 34 and a power supply circuit including the transistors Q10 to Q18 constitute a second means 48 for supplying the electric energy for rewinding the tape to the motor 24.

Figure 3:
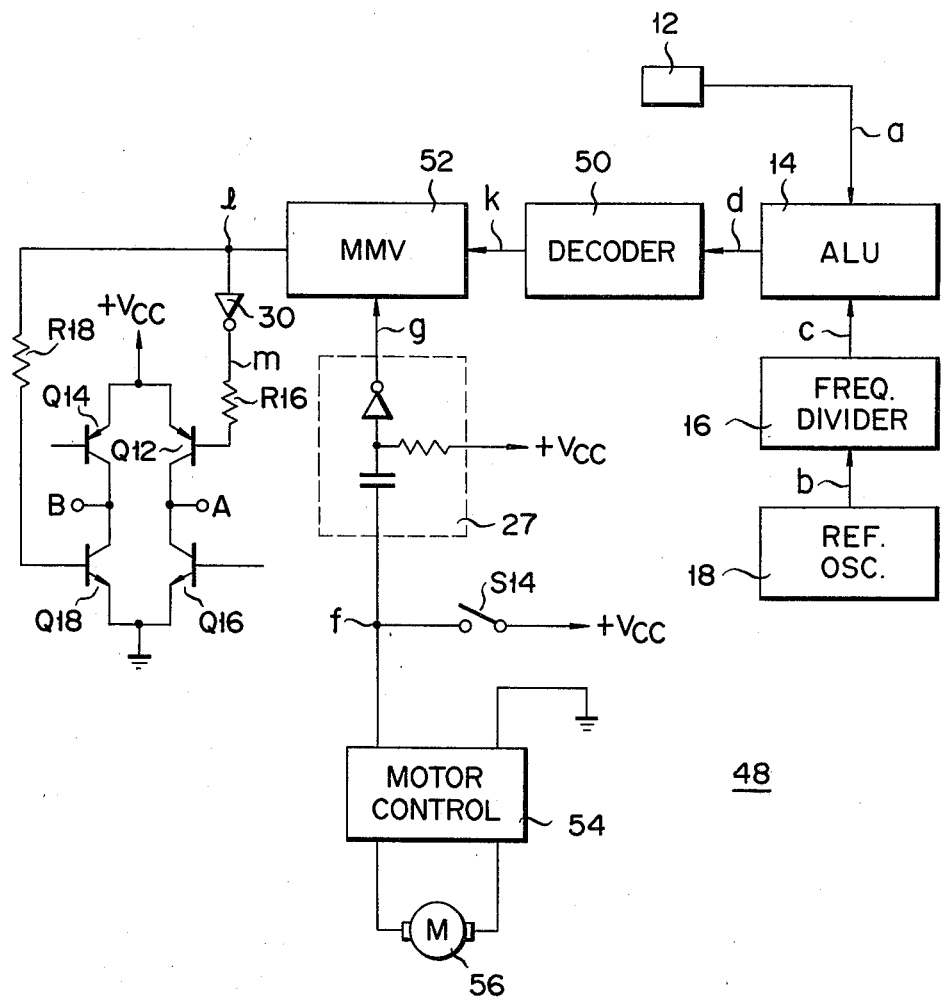
FIG. 3 is a block diagram showing another embodiment of the back spacing apparatus according to the invention.

The situation of the instant t10 in FIG. 2 corresponds to the case when the supply reel side tape roll diameter is large. Consequently, it is necessary at this time to cause rotation of the reel base 46 to a small extent for effecting the rewinding of a predetermined length of the tape. For example, if the supply reel side tape roll diameter is 25 mm at the instant t10 and the tape length to be rewound is 40 mm, the reel base 46 may be rotated by about one-half rotation during a period corresponding to the width Tm. If the supply reel side tape roll diameter is 13 mm and the tape length to be rewound is also 40 mm, the reel base 46 may be rotated by about one rotation within a period corresponding to the pulse with Tm. Thus, the extent of the rotation of the reel base 46 for a constant period of time (Tm), i.e., the r.p.m. of the reel base 46, is substantially proportional to the voltage of the seventh signal j. This means that it is possible to obtain automatic rewinding of only a predetermined length of the tape irrespective of the supply reel side tape roll diameter by appropriately selecting the one-to-one correspondence relation between the period Tn of the first signal a and the voltage of the seventh signal j.

Figure 4:
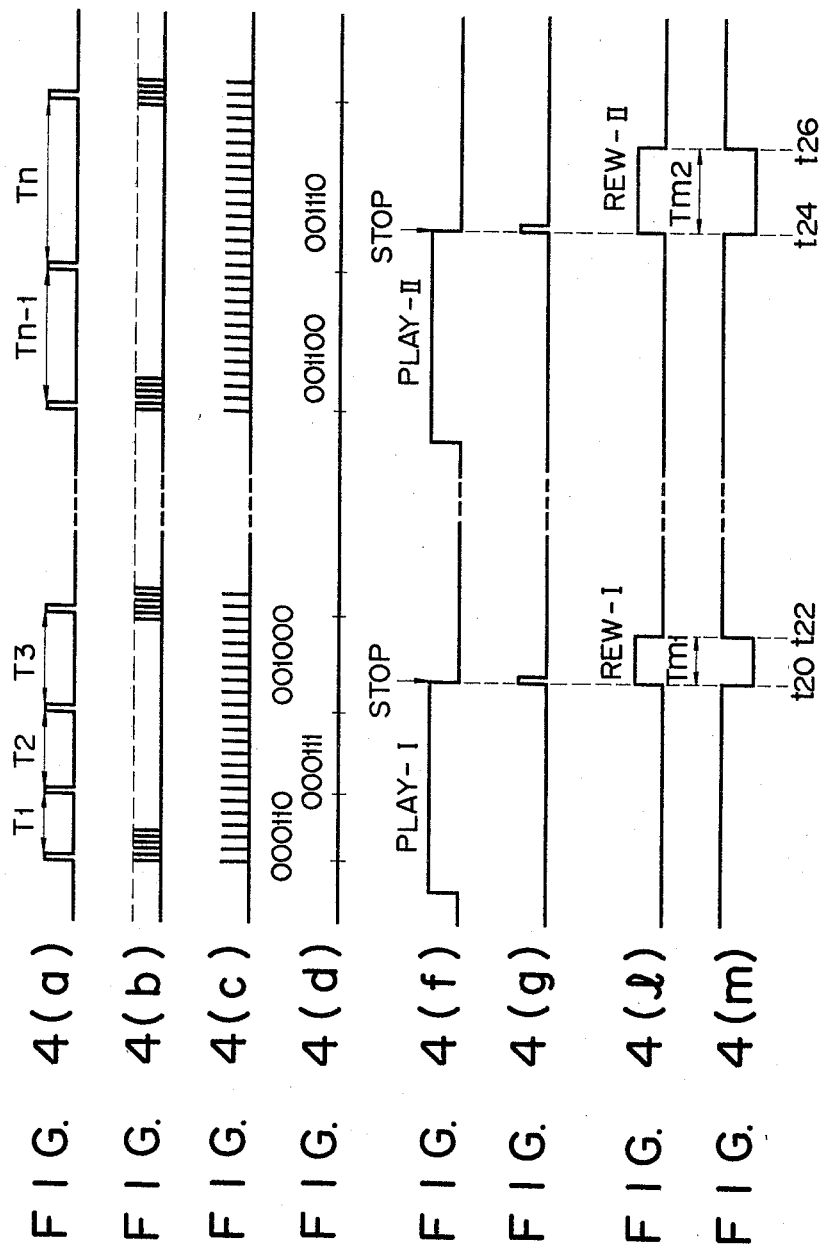
FIGS. 4(a),4(b),4(c),4(d),4(f), 4(g),4(l) and 4(m) are diagrams of signals illustrating the operation of the apparatus shown in FIG. 3.

FIG. 3 shows a modification of the back spacing apparatus as shown in FIG. 1. In the apparatus of FIG. 1, for varying the electric energy supplied to the reel motor 24 the supply voltage (i.e., the voltage of the seventh signal j) to the motor 24 is varied. In the apparatus of FIG. 3, for the variation of the electric energy the period of power supply to the motor 24, i.e., the period of the rewinding operation, is varied. Similar to the case of FIG. 1, the third signal d corresponding to the first signal a is produced from the ALU circuit 14. When playback mode PLAY-I is switched over to stop mode, for instance, at an instant t20 as shown in FIG. 4f, the binary code of the third signal d is "001000" as shown in FIG. 4d. The third signal d is coupled to a decoder 50. The decoder 50 produces an eighth signal k, which corresponds to the code of the third signal d and includes a plurality of signals with only a particular bit thereof being at a high level. Alternatively, it may be a shift register, with which a high level output is shifted bit by bit every time the binary code of the third signal d is increased by "1". If the shift register is a 16-bit shift register, a 16-bit signal is produced as the eighth signal k from the decoder 50. This eighth signal k is coupled to a monostable multivibrator (MMV) 52.

Figure 5:
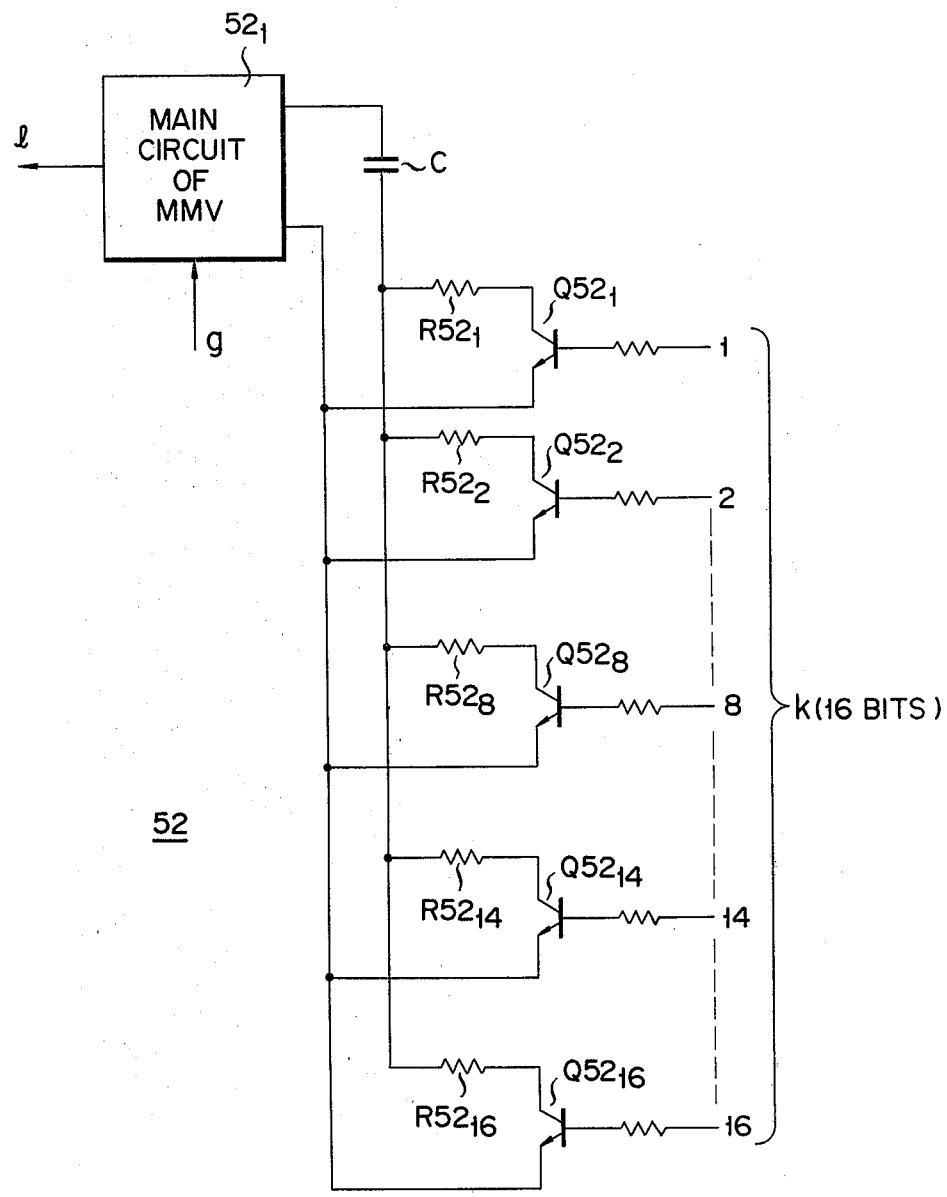
FIG. 5 is a circuit diagram showing a time constant switching circuit in the MMV 52 shown in FIG. 3.

As shown in FIG. 5, the MMV 52 includes a plurality of time constant circuits $CR52_1$ to $CR52_{16}$ and transistor switching circuits $Q52_1$ to $Q52_{16}$ for selecting these time constant circuits. Now, a case when a binary code "001000" is produced as the third signal d so that the eighth bit in the eighth signal k is inverted to the high level is considered. At this time, the transistor switch $Q52_8$ in the MMV 52 selects the time constant circuit $CR52_8$ which corresponds to the high level eighth bit. At this time, with the triggering of the MMV 52 caused by the trigger pulse g supplied from the trigger pulse generator 27, a ninth signal l having a pulse width Tm1 is produced from an instant t20 till an instant t22, as shown in FIG. 4l, from the MMV 52. With the ninth signal l the transistors Q12 and Q18 are turned "on". As a result, the motor 24 (not shown in FIG. 3) which is connected to the terminals A and B is rotated in the clockwise direction similar to the case of FIG. 1. That is, the supply reel 46 (not shown in FIG. 3) is rotated in the clockwise direction for a period corresponding to the pulse width Tm1 with the constant voltage (+Vcc). In other words, the period of the rewinding operation corresponds to the pulse width Tm1.

Now, a case when the tape deck operation is switched from playback mode PLAY-II over to stop mode at an instant t24 will be considered. It is assumed that at this time the binary code of the third signal d is "001110" so that the fourteenth bit in the eighth signal k is inverted to the high level. At this time, the transistor switch $Q52_{14}$ in the MMV 52 selects the time constant circuit $CR52_{14}$ which corresponds to the fourteenth bit. When the MMV 52 is triggered by the trigger pulse g at this time, it produces the ninth signal l of a pulse width Tm2 from an instant t24 to an instant t26. With this ninth signal l the transistors Q12 and Q18 are turned "on", so that the supply reel 46 is rotated in the clockwise direction for a period corresponding to the pulse width Tm2 with the constant voltage ($\approx$+Vcc). In other words, the period of the rewinding operation corresponds to the pulse width Tm2.

FIG. 3 shows the capstan motor circuit 54 which is omitted in FIG. 1. The fifth signal f, which is produced at the junction point of the switch S14 and trigger pulse generator 27, is coupled to the motor control circuit 54. A capstan motor 56 is connected between the output terminals of the control circuit 56. The control circuit 54 may, for instance, be a speed regulator IC model TCA 955 by Siemens Co. in West Germany. In the case of FIG. 3, the second means 48 is constituted by the components 14 to 18, 27 and 30 and a power supply circuit including the transistors Q12 to Q18.

It will be seen from the above description that in the apparatus of FIG. 3 the voltage ($\approx$+Vcc) supplied to the motor 24 is not varied, but the period of the voltage supply is varied. This can be thought to be the same in effect as the apparatus of FIG. 1 in view of the electric energy supplied for the rewinding operation. With the apparatus of FIG. 3, the smaller the supply reel side tape roll diameter the longer is made the pulse length of the ninth signal l (e.g. from Tm1 to Tm2), that is, with the reduction of the tape roll diameter the period of the rewinding operation is increased. In this way, a constant tape length can be automatically rewound irrespective of the supply reel side tape roll diameter.

The apparatuses which are illustrated and described here are by no means limitative, and various changes and modifications are possible without departing from the scope and spirit of the invention as defined in the claims. For example, it is possible to provide the Hall element 12 on the side of the supply reel 46 in FIG. 1 and use a signal e having a level which is inversely proportional to the value of the third signal d in lieu of the fourth signal $\bar{e}$. Also, it is possible to use the D/A converter 22 in FIG. 1 in lieu of the decoder 50 in FIG. 3 so that the DC level of the fourth signal e produced from the D/A converter 22 is coupled to the MMV 52. In this case, according to the DC level, the inversion level of the output of the MMV 52 is changed to vary the pulse width Tm of the ninth signal 1. Further, it is possible to combine the apparatuses of FIGS. 1 and 3 so as to vary the r.p.m. of the supply reel as well as the period of the rewinding operation at the same time.

What we claim is:

1. A back spacing apparatus for a transcribing machine having a tape supply reel (10) and a take-up reel (46), comprising:

first means (12) coupled to one of said reels (10,46) of said transcribing machine for generating a first signal (a) which is a function of the rotation period of said one reel;

drive means (24, 36-44) coupled to said supply reel (46) and responsive to an electrical signal having a given amount of electrical energy (Tm×V) for rewinding a tape toward said supply reel (46); and second means (48) coupled to said first means (12) and to said drive means (24, 36-44) and responsive to said first signal (a) for generating said electrical signal having said given amount of electrical energy (Tm×V) for energizing said drive means for a given period of time such that the length of the tape rewound toward said supply reel (46) is substantially constant irrespective of a tape roll diameter of said supply reel (46).

2. A back spacing apparatus for a transcribing machine having a tape supply reel (10) and a take-up reel (46), comprising:

first means (12) coupled to one of said reels (10, 46) of said transcribing machine for generating a first signal (a) which is a function of the rotation period of said one reel;

drive means (24, 36-44) coupled to said supply reel (46) and responsive to an electrical signal having a given amount of electrical energy (Tm×V) for rewinding a tape toward said supply reel (46) for a given rewind operation period (Tm); and second means (48) coupled to said first means (12) and to said drive means (24, 36-44) and responsive to said first signal (a) for generating said electrical signal having said given amount of electrical energy (Tm×V) for varying the rewinding operation period (Tm) of said supply reel (46) by changing the amount of said electrical energy (Tm×V) in said electrical signal so that the length of the tape rewound toward said supply reel (46) is substantially constant irrespective of a tape roll diameter of said supply reel (46).

3. A back spacing apparatus according to claim 1 or 2, wherein said second means (48) includes:

third means (16, 18) for providing a second signal (c) having a predetermined period;

fourth means (14) coupled to said third means and to said first means for providing a third signal (d) corresponding to said first signal (a) according to said second signal (c); and fifth means (22) coupled to said fourth means for converting said third signal (d) into a fourth signal (e) having a voltage level (V1 or V2) corresponding to said amount of electrical energy (Tm×V).

4. A back spacing apparatus according to claim 1 or 2, wherein said second means (48) includes:

third means (16, 18) for providing a second signal (c) having a predetermined period;

fourth means (14) coupled to said third means and to said first means for providing a third signal (d) corresponding to said first signal (a) according to said second signal (c);

sixth means (50) coupled to said fourth means for providing an eighth signal (k) having a predetermined code corresponding to said third signal (d); and seventh means (52) coupled to said sixth means for converting said eighth signal (k) into a ninth signal (l) having a signal width (Tm1 or Tm2) corresponding to said amount of electrical energy (Tm×V).

5. A back spacing apparatus according to claim 4, wherein said seventh means (52) includes:

time constant circuits ($CR52_1$ to $CR52_{16}$) corresponding in number to the number of different codes in said eighth signal (k);

switch circuits ($Q52_1$ to $Q52_1$) coupled to said time constant circuits and each selecting a particular one of said time constant circuits in response to a particular code represented by said eighth signal (k); and a monostable multivibrator circuit ($52_1$) operated according to the time constant determined by said particular time constant circuit selected by said switch circuits ($Q52_1$ to $Q52_{16}$).

6. A back spacing apparatus according to any one of claims 1, 2 or 5, wherein said drive means includes:

a drive motor (24) rotated in a predetermined direction by said electrical signal having said given amount of electrical energy; and a rotational force transmitting mechanism (36–44) arranged to be coupled to said supply reel (46) with the rotation of said drive motor in said predetermined direction for transmitting the rotation of said drive motor to said supply reel (46).

7. A back spacing apparatus according to claim 3, wherein said drive means includes:

a drive motor (24) rotated in a predetermined direction by said electrical signal having said given amount of electrical energy; and a rotational force transmitting mechanism (36–44) arranged to be coupled to said supply reel (46) with the rotation of said drive motor in said predetermined direction for transmitting the rotation of said drive motor to said supply reel (46).

8. A back spacing apparatus according to claim 4, wherein said drive means includes:

a drive motor (24) rotated in a predetermined direction by said electrical signal having said given amount of electrical energy; and a rotational force transmitting mechanism (36–44) arranged to be coupled to said supply reel (46) with the rotation of said drive motor in said predetermined direction for transmitting the rotation of said drive motor to said supply reel (46).

9. A back spacing apparatus according to claim 3, which further comprises eighth means (S14, 27 to 34, Q12 to Q18) coupled to said fifth means (22) for transmitting power corresponding to said fourth signal (e) to said drive means (24) for rewinding said tape in a given timing relative to the power supply to the transcribing machine.

10. A back spacing apparatus according to claim 4, which further comprises ninth means (S14, 27, 30, Q12 to Q18) coupled to said seventh means (52) for transmitting power corresponding to said ninth signal (l) to said drive means (24) for rewinding said tape in a given timing relative to the power supply to said transcribing machine.

11. A back spacing apparatus according to claim 1 or 2, wherein said electrical energy (Tm×V) of said electrical signal is proportional to the product of the diameter of the tape roll on the supply reel and the number of rotations to be made by said supply reel to rewind tape towards said supply reel.

* * * * *